Oct. 22, 1940.  N. C. BREMER  2,219,125
TRANSMISSION CHAIN
Filed Sept. 5, 1939
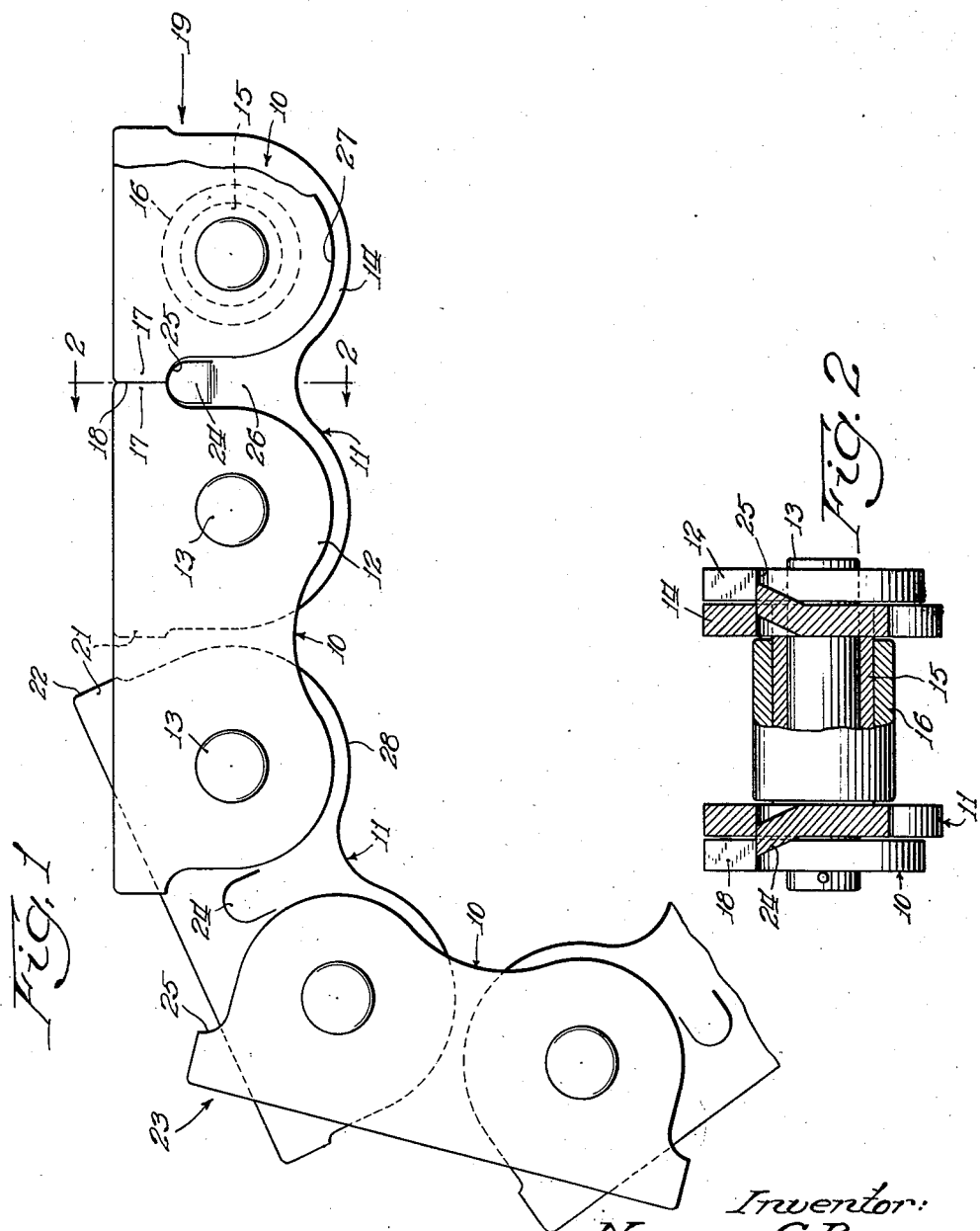
Inventor:
Norman C. Bremer
By Edward C. Gritzbaugh
Atty.

Patented Oct. 22, 1940

2,219,125

UNITED STATES PATENT OFFICE 2,219,125

TRANSMISSION CHAIN

Norman C. Bremer, Ithaca, N. Y., assignor to Morse Chain Company, Ithaca, N. Y., a corporation of New York Application September 5, 1939, Serial No. 293,319

4 Claims. (Cl. 74—250)

This invention relates to transmission chains of the "anti-whip" type, and has as its object to provide an improved and efficient yet simplified construction for preventing "backward" flexing in the straight reaches of such a chain. By "backward" flexing I mean flexing in a direction opposite to the direction of normal flexing of the chain when passing around a sprocket. The purpose of thus eliminating backward flexing is to inhibit whipping of the unsupported reaches of the chain.

Other and more detailed objects and advantages of my invention will become apparent from a reading of the following specification taken in connection with the appended drawing which forms a part thereof and wherein:

Fig. 1 is a side elevation of a chain embodying the invention;

Fig. 2 is a sectional view thereof taken as indicated by the line 2—2 of Fig. 1.

As an illustration of one form in which the invention may be embodied, I have shown in the drawing an automotive timing chain of the roller type, embodying alternate pin links 10 and roller links 11. The pin links 10 include side plates 12 mounted in spaced relation upon pivot pins 13. The roller links 11 comprise side plates 14 mounted in spaced relation upon bushings 15. The bushings 15 are journalled on the pins 13. Journalled on the bushings 15 are rollers 16.

A straight stretch of the chain, extending between sprockets, is indicated at 19. At 23 a portion of the chain is shown flexed as when passing around a sprocket.

The pin link side plates 12 are provided with end projections 17 having squared end edges 18. "Backward" flexing between adjacent pin links is prevented by abutting engagement of the edges 18 of the projections 17 of adjacent links.

The roller links 11 are similarly provided with end projections 21 having squared end edges 22. "Backward" flexing between adjacent roller links is prevented by the engagement of the squared edges 22 of adjacent projections 21.

It has been proposed to utilize the cooperation of the abutting engagement between adjacent pin links and the abutting engagement between adjacent roller links, to eliminate whip in a chain of this general type. However, although a considerable proportion of the whip may be eliminated in this manner, such abutting engagement is not capable in itself of completely eliminating whipping, and may result in objectionable shortening of the pitch length of the chain. In such a construction, it is possible for a certain amount of flexing to occur between a pin link and an adjacent roller link, through the dislocation of an entire link outwardly beyond the adjacent links. Such dislocation of links out of the line of the remaining links results in shortening of the pitch length of the chain, unduly tightening the chain upon its sprockets, and may also result in a certain amount of binding between the links when they commence to flex as they travel on to a sprocket.

To relieve this condition, the present invention provides in each of the roller link side plates 14, an upstruck lug 24, and the projections 17 are formed with shoulders 25 which are adapted to seat upon the lugs 24. In order to form the shoulders 25 and provide spaces 26 to receive the lugs 24, the curved edges 27 of the pin link side plates 12 are formed on a shorter radius than the curved edges 28 of the roller link side plates 14, the ends of which are brought close to each other.

The main load of supporting the links against whipping is carried by the abutting projections 17 and 21. The lugs 24 function primarily to guide the projections 17 into proper registering engagement. If the lugs 24 were relied upon to carry the load of preventing "backward" flexing, the "anti-whip" characteristic of the chain would be far less certain for the reason that the lugs would tend to yield under the pressure of the projections 17.

Although successful "anti-whip" roller chains have heretofore been constructed, such chains have utilized members that were entirely separate from the link side plates, for preventing the backward bending. The present invention contemplates an improvement over such chains in that fully as efficient results are secured by the employment of means which is integral with the link plates and does not add materially to their cost.

Each roller link will, as it leaves the sprocket, become aligned with the preceding pin link as a result of contact of its lug 24 by the projection 17 of the pin link. The following pin link will be pulled into alignment with the roller link as it leaves the sprocket and its projection 17 will simultaneously engage the projection 17 of the preceding pin link and the lug 24. Thus the links of the chain are aligned as they leave the sprocket. Any subsequent tendency to "whip" in the straight stretch will be prevented by the engagement of the projections 17.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. A transmission chain comprising alternating links pivoted together in end-to-end relationship, each link embodying a pair of spaced side plates, the side plates of alternate links having their adjacent ends formed with projections adapted to engage each other in abutting relationship when the links are in alignment for preventing backward flexing of the chain, and the side plates of the intervening links being each formed with means adapted to engage the projection of a preceding link to guide the said intervening link as it leaves the sprocket, into alignment with said preceding link, the following link being adapted, as it leaves the sprocket, to make contact through its projection with the projection of the preceding link and to thereupon become aligned with said preceding link.

2. In a transmission chain, alternating links pivoted together in end-to-end relationship, each link embodying a pair of spaced side plates, the side plates of alternate links having their adjacent ends formed with projections adapted to abut each other when the links are aligned for preventing backward flexing of the chain, and the side plates of the intervening links being each formed with a laterally projecting lug adapted, as said intervening link leaves the sprocket, to engage the projection of the preceding link to guide the said intervening link into alignment with said preceding link, the following link being adapted, as it leaves the sprocket, to make contact through its projection with the projection of the said preceding link and with the lug of the said intermediate link and to thereupon become aligned with said preceding and intermediate links.

3. A transmission chain comprising alternating links each comprising spaced side plates, the side plates of alternate links having their adjacent links formed with projections extending beyond the ends of such links, and adapted to abut each other when the links are aligned for preventing backward flexing of the chain, and the side plates of the intervening links being formed with lugs projecting laterally into the spaces formed between the ends of the other links and adapted to engage said projections so as to maintain them in registering relationship, the lug of each intervening link being adapted, as the latter leaves the sprocket, to engage the projection of the preceding link to guide the said intervening link into alignment with said preceding link, the following link being adapted, as it leaves the sprocket, to make contact through its projection with the projection of the said preceding link and with the lug of the said intermediate link and to thereupon become aligned with said preceding and intermediate links.

4. In a transmission chain, alternating pin links and roller links, said pin links comprising pins and side plates mounted on the ends of said pins, said roller links comprising roller bushings and side plates mounted thereon in spaced relationship between the pin link side plates, rollers journalled on said bushings, projections formed on the ends of said pin link side plates and extending beyond said ends to form spaces therebetween, said projections being adapted to engage each other in abutting relationship when the links are in alignment so as to prevent backward flexing of the chain, and lugs upstruck from the central regions of the roller link side plates, extending into said spaces between the ends of the pin link side plates, the lug of each intervening link being adapted, as the latter leaves the sprocket, to engage the projection of the preceding link to guide the said intervening link into alignment with said preceding link, the following link being adapted, as it leaves the sprocket, to make contact through its projection with the projection of the said preceding link and with the lug of the said intermediate link and to thereupon become aligned with said preceding and intermediate links.

NORMAN C. BREMER.

CERTIFICATE OF CORRECTION.

Patent No. 2,219,125.  October 22, 1940.

NORMAN C. BREMER.

It is hereby certified that error appears in the printed specification of the above numbered patent requiring correction as follows: Page 2, first column, line 46, claim 3, for the word "links" read --ends--; and that the said Letters Patent should be read with this correction therein that the same may conform to the record of the case in the Patent Office.

Signed and sealed this 31st day of December, A. D. 1940.

(Seal)

Henry Van Arsdale,
Acting Commissioner of Patents.